United States Patent [19]

Koga

[11] Patent Number: 6,052,416
[45] Date of Patent: Apr. 18, 2000

[54] DATA PROCESSOR AND DATA RECEIVER

[75] Inventor: Toshio Koga, Tokyo, Japan

[73] Assignee: NEC Corporation, Tokyo, Japan

[21] Appl. No.: 08/944,295

[22] Filed: Oct. 6, 1997

[30] Foreign Application Priority Data

Oct. 9, 1996 [JP] Japan .................................. 8-268326

[51] Int. Cl.⁷ .............................. H04N 7/32; H04N 7/30; H04N 7/12
[52] U.S. Cl. ......................... 375/240; 348/397; 348/402
[58] Field of Search .................................. 348/402, 407, 348/409, 415, 413, 416, 417, 397, 398; H04N 7/30, 7/32, 7/12

[56] References Cited

U.S. PATENT DOCUMENTS

| | | | |
|---|---|---|---|
| 5,349,383 | 9/1994 | Parke et al. . | |
| 5,418,571 | 5/1995 | Ghanbari | 348/416 |
| 5,515,377 | 5/1996 | Horne et al. | 370/94.1 |
| 5,742,343 | 4/1998 | Haskell et al. | 348/415 |
| 5,852,565 | 12/1998 | Demos | 364/715.02 |
| 5,973,739 | 10/1999 | Nilsson | 348/379 |

FOREIGN PATENT DOCUMENTS

| | | |
|---|---|---|
| 0595403A1 | 5/1994 | European Pat. Off. . |
| 0627858A2 | 12/1994 | European Pat. Off. . |
| 0710030A1 | 5/1996 | European Pat. Off. . |
| 0712251A2 | 5/1996 | European Pat. Off. . |
| 51-117820 | 10/1976 | Japan . |
| 61-214885 | 9/1986 | Japan . |
| 63-131273 | 6/1988 | Japan . |
| 1-194568 | 8/1989 | Japan . |
| 5167868 | 7/1993 | Japan . |
| 6-113292 | 4/1994 | Japan . |
| 7-226934 | 8/1995 | Japan . |
| 7-240920 | 9/1995 | Japan . |
| 8-242379 | 9/1996 | Japan . |

OTHER PUBLICATIONS

Japanese Office Action dated Nov. 27, Hei 11 with English language translation of Japanese Examiner's comments.

M. Ghanbari; Two–Layer Coding of Video Signals for VBR Networks, IEE Journal on Selected Areas in Communications; Jun. 1989; No. 5, New York.

*Primary Examiner*—Howard Britton
*Assistant Examiner*—Nhon T Diep
*Attorney, Agent, or Firm*—Whitham, Curtis & Whitham

[57] ABSTRACT

A data processor includes a first encoder, a first storage medium, a subtracter, a second encoder, a second storage medium, and an output section. The first encoder generates, by using a predetermined first coding method, a main code prepared by encoding a moving picture signal input as an original signal. The first storage medium stores the main code generated by the first encoder. The subtracter calculates a coding distortion generated upon coding by the first encoder. The second encoder encodes, by using a predetermined second coding method, the coding distortion calculated by the subtracter, thereby generating a compensation code. The second storage medium stores the compensation code generated by the second encoder. The output section outputs the main and compensation codes respectively stored in the first and second storage media.

14 Claims, 6 Drawing Sheets

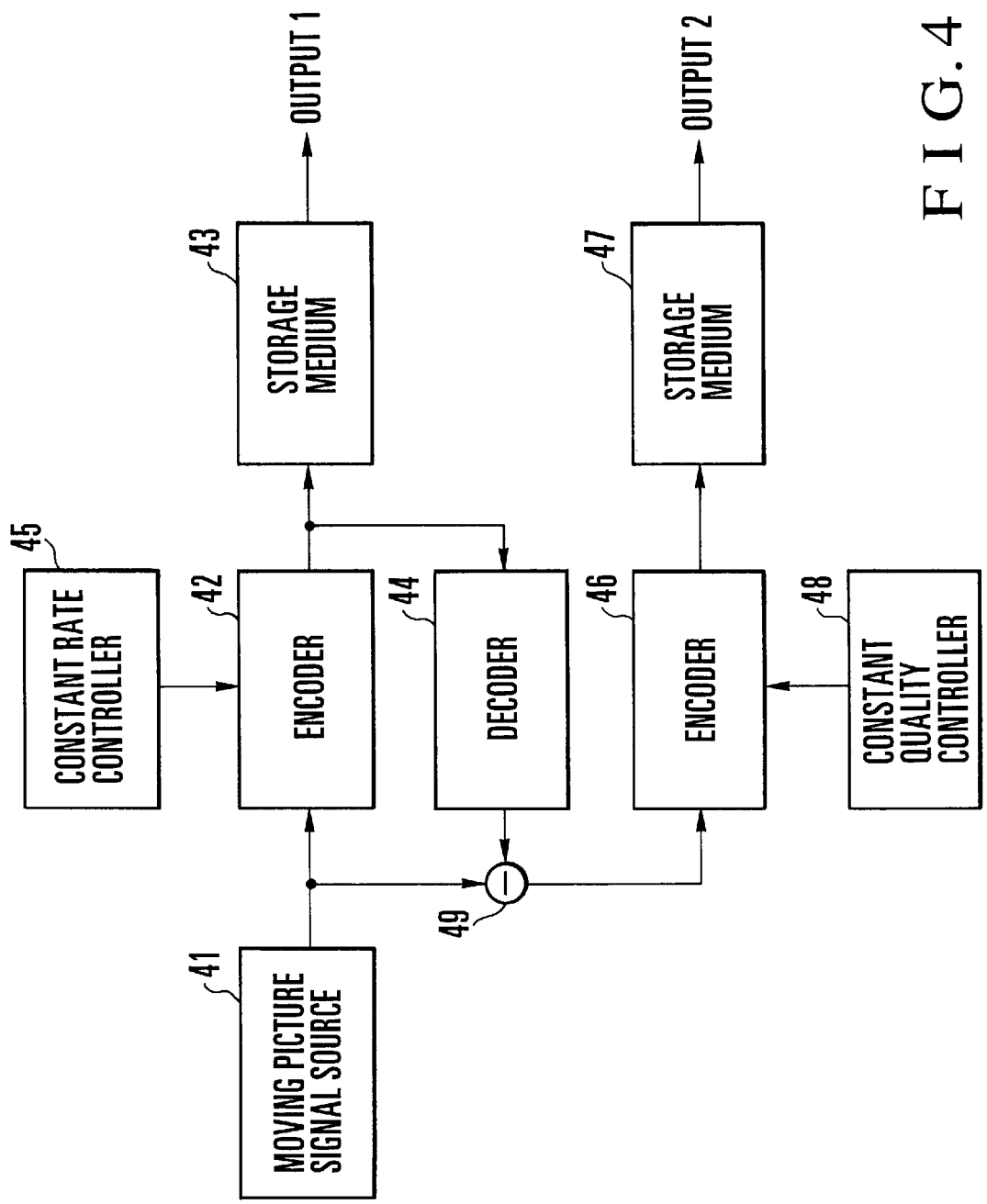
F I G. 4

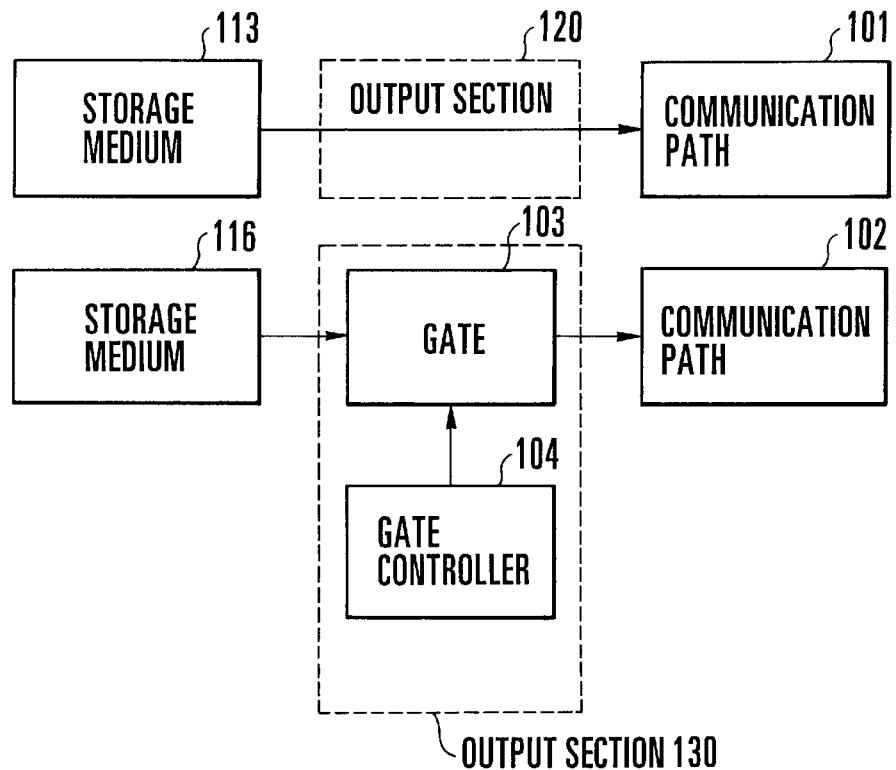
F I G. 5
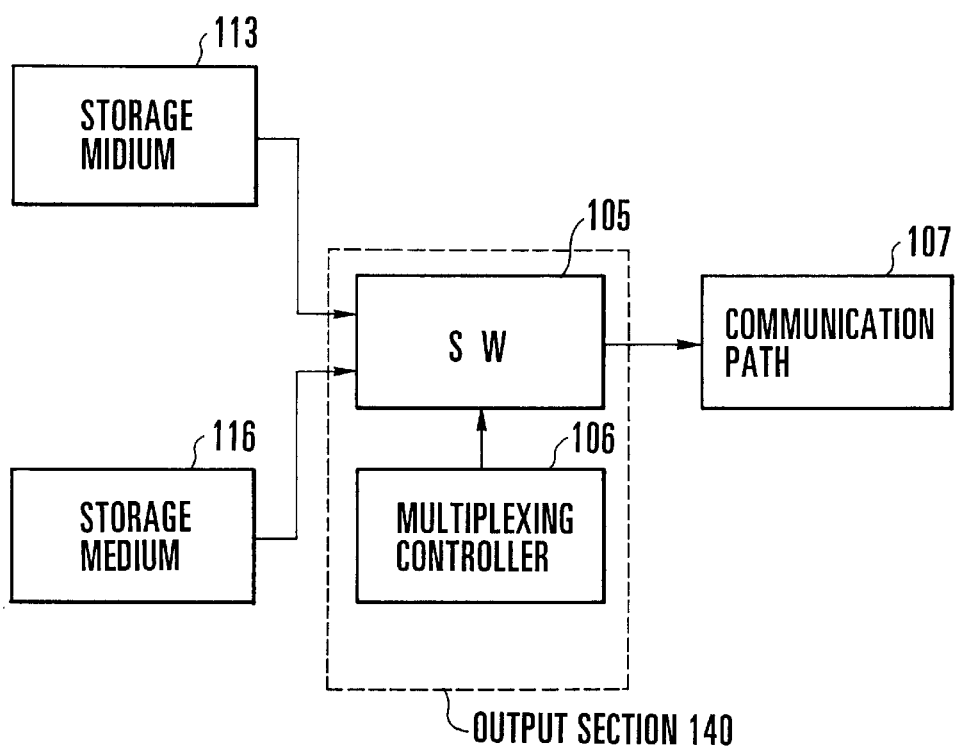
F I G. 6

DATA PROCESSOR AND DATA RECEIVER

BACKGROUND OF THE INVENTION

The present invention relates to a data processor for constructing a database of encoded moving picture signals, and a receiver which receives an output from the data processor.

The use of the original signals of picture signals, and particularly, moving picture signals increases the data amount. For this reason, before transmitting an original signal without any change or reading/writing it between storage media, the original signal is generally subjected to compression coding (to be simply referred to as coding hereinafter) to eliminate statistical and visual redundancies.

Usually, a picture signal thus encoded is transferred via a communication line or stored in a storage medium at a fixed transfer or read/write rate called an STM (Synchronous Transfer Mode).

In recent years, a new transfer method called an ATM (Asynchronous Transfer Mode) capable of instantaneously changing the transfer rate is becoming available. At present, however, STM service systems are always considered for communication application and storage application, and coding at the fixed rate is assumed to realize the quality of an encoded picture (to be simply referred to as a picture quality hereinafter) free from any practical problem.

FIG. 9 shows a conventional picture database. While a moving picture signal 1 input to the database is controlled with a parameter by a constant rate controller 2 so as to keep the transfer rate constant, the picture signal is encoded by an encoder 3 and stored in a storage medium 4.

As is well known, the special and time correlations between dynamic pictures often change locally, instantaneously, and abruptly. For example, the information amount generated by lossy coding generally called high-efficiency coding, such as H.261 serving as an international standard coding scheme for a video phone and a video conference picture signal, and MPEG-1 and MPEG-2 serving as international standard coding schemes used for the purpose of storage/communication/broadcast, greatly changes depending on the redundancy of an input picture.

To stably realize a high picture quality at a fixed transfer rate for various input pictures having different redundancies, the transfer rate must be fixed high, which is not a proper method in practice. At present, the picture quality is slightly sacrificed to fix the transfer rate lower and simplify the system configuration. For economical advantages, the rate to be fixed is set as low as possible.

A typical example of the transfer rate in the use of high-efficiency coding is a case wherein an NTSC color TV signal is encoded using MPEG-2 while maintaining a good picture quality. At this time, a proper transfer rate is said to be 6 Mb/s for each channel. At present, the digital television picture transfer technology is being introduced into satellite broadcasting, terrestrial broadcasting, a cable television, and the like, the transfer rate is one of the most important parameters in system design.

When coding at a fixed rate results in an insufficient picture quality, if the coding rate can be intermittently increased, a higher picture quality can be attained as a whole in many cases. Generally speaking, coding is usually performed at a fixed rate to output "main information", and when the picture quality is unsatisfactory with only the main information, "compensation information" that reduces a distortion caused by coding (coding distortion) is to be added, thereby greatly improving the picture quality.

One example of the prior arts employing this idea is "TV SIGNAL CODING EQUIPMENT" (Prior Art 1) disclosed in Japanese Patent Laid-Open No. 51-117820. According to this technique, as shown in FIG. 10, a temporarily encoded picture (encoded information $e_1$) is decoded (into a decoded signal y') on the transmission side, a difference (coding distortion information $e_2$) between the original picture (input picture signal y) and the decoded signal is also encoded and multiplexed with the main encoded information $e_1$, and the obtained signals are transferred via a single transfer path. The coding distortion information $e_2$ is "compensation information". On the reception side, the encoded information $e_1$ is decoded into the decoded picture signal y', and compensation is performed based on the coding distortion information $e_2$ to output a picture signal y". The degree of picture quality is higher in the order of y, y", and y'.

Another similar prior art is "CODING AND DECODING DEVICE FOR ANIMATING PICTURE SIGNAL" (Prior Art 2) disclosed in Japanese Patent Laid-Open No. 61-214885. Compared to Prior Art 1, this technique expands to a case using both motion-compensated interframe prediction and orthogonal transform.

In both Prior Arts 1 and 2, when the picture quality is unsatisfactory, "compensation information" is added to "main information" and transferred in order to reduce a coding distortion. However, to improve the picture quality improved as in Prior Arts 1 and 2 on the assumption of transfer by the STM as a general transfer form at present, the transfer rate must be determined on the basis of the information amount upon adding "compensation information", and a higher transfer rate is required.

In both Prior Arts 1 and 2, data generated by coding is formed as data in which "main information" and "compensation information" are integrally inseparable from each other. That is, the information made up of the two kinds of information corresponds to substantial "main information". For this reason, a database constructed by only conventional "main information" cannot be used without any change, and a database must be reconstructed with original picture signals.

SUMMARY OF THE INVENTION

It is an object of the present invention to provide a database processor and a receiver for constructing a database with a higher picture quality in a dynamic picture database storing encoded picture information while utilizing picture data stored in a conventional database.

In order to achieve the above object, according to the present invention, there is provided a data processor comprising first coding means for generating, by using a predetermined first coding method, a main code prepared by encoding a moving picture signal input as an original signal, first storage means for storing the main code generated by the first coding means, coding distortion calculation means for calculating a coding distortion generated upon coding by the first coding means, second coding means for encoding, by using a predetermined second coding method, the coding distortion calculated by the coding distortion calculation means, thereby generating a compensation code, second storage means for storing the compensation code generated by the second coding means, and output means for outputting the main and compensation codes respectively stored in the first and second storage means.

BRIEF DESCRIPTION OF THE DRAWINGS

FIG. 4 is a block diagram of a data processor according to the fourth embodiment of the present invention;

FIG. 5 is a block diagram for explaining the first example of supplying encoded data from the database according to the present invention;

FIG. 6 is a block diagram for explaining the second example of supplying encoded data from the database according to the present invention;

DESCRIPTION OF THE PREFERRED EMBODIMENTS

The present invention will be described in detail below with reference to the accompanying drawings.

Figure 1:
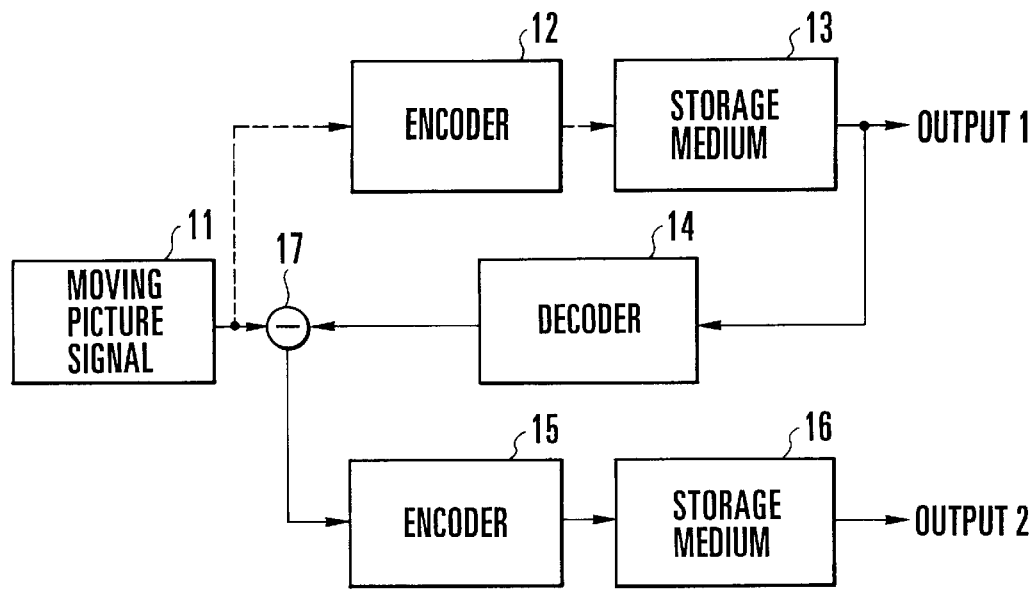
FIG. 1 is a block diagram of a data processor according to the first embodiment of the present invention in which a coding distortion information database is added to an existing dynamic picture database.

FIG. 1 shows an arrangement of the first embodiment when the present invention is applied to a main data processor in which a moving picture signal 11 has already been encoded based on a predetermined coding method, and stored as a database in a storage medium 13. In this embodiment, additional information is newly added to a main data processor storing a database which is conventional used, thereby improving the picture quality provided to the database user.

In the main data processor shown in FIG. 1, an input original signal (moving picture signal 11) is encoded into a main code by an encoder 12 and stored in the storage medium 13 in advance. The encoder 12 and the storage medium 13 constitute the existing main data processor. In this embodiment, an auxiliary data processor having the following arrangement is connected to the existing main data processor.

A decoder 14 reads the main code from the storage medium 13, and decodes it into a main signal. The decoded main signal generally contains a coding distortion, and a difference between the decoded main signal and the original signal 11 is calculated by a subtracter 17. This difference is a coding distortion, and is not zero in general. This coding distortion is encoded by an encoder 15 using the same coding method as that of the encoder 12, and stored in a storage medium 16. This processing is performed for all main codes stored in the storage medium 13. The coding method used in the encoder 15 may be part of the coding method used in the encoder 12.

The operation rates of the decoder 14 and the encoder 15 are not unique. For example, when calculation of a coding distortion is executed using a computer, the rates of signal supply from both the storage medium 13 and the original signal 11 are easily matched to the computer. For this purpose, a large-capacity storage medium which can be easily accessed from the computer may be used for both the storage medium 13 and the original signal 11. As for the input moving picture signal 11, a digital VTR is usable recently, which often incorporates a rate adjustment buffer memory in order to exchange picture data with the computer.

The encoder 15 need not always operate in "real time". A picture is encoded by the computer slower than "real time", and the encoded picture is stored in the storage medium 16. With this processing, a high picture quality can be realized only by newly adding an auxiliary database without changing a conventional database. In this case, the "real time" operation means an operation using a TV signal standardization frequency of, e.g., about 10 to 15 MHz, but a detailed operation rate is not limited to this. At the operation rate of the computer, a moving picture signal such as a TV signal is generally difficult to process in "real time". More specifically, when the TV signal is an NTSC signal, it generates about 30 pictures per second. Encoding all the 30 pictures within one second requires an ability substantially equal to that of a supercomputer.

The dynamic picture database has two output systems. In this embodiment, for example, for a special user who pays a predetermined additional charge, output 2, i.e., coding distortion information in addition to output 1 is sent to provide a high-quality picture service. For a general user who does not pay an additional charge, only output 1 is supplied. In this manner, a dynamic picture database in a service form can be provided.

The first embodiment has exemplified the case wherein the auxiliary data processor according to the present invention is applied to the main data processor storing an existing picture database. When the latest picture not stored in an existing database, such as the latest movie, is to be newly encoded, the whole system must be operated in real time for moving picture signals output from a medium operating in real time such as a VTR. In the second embodiment of the present invention, the first coding and the second coding are performed in real time.

Figure 2:
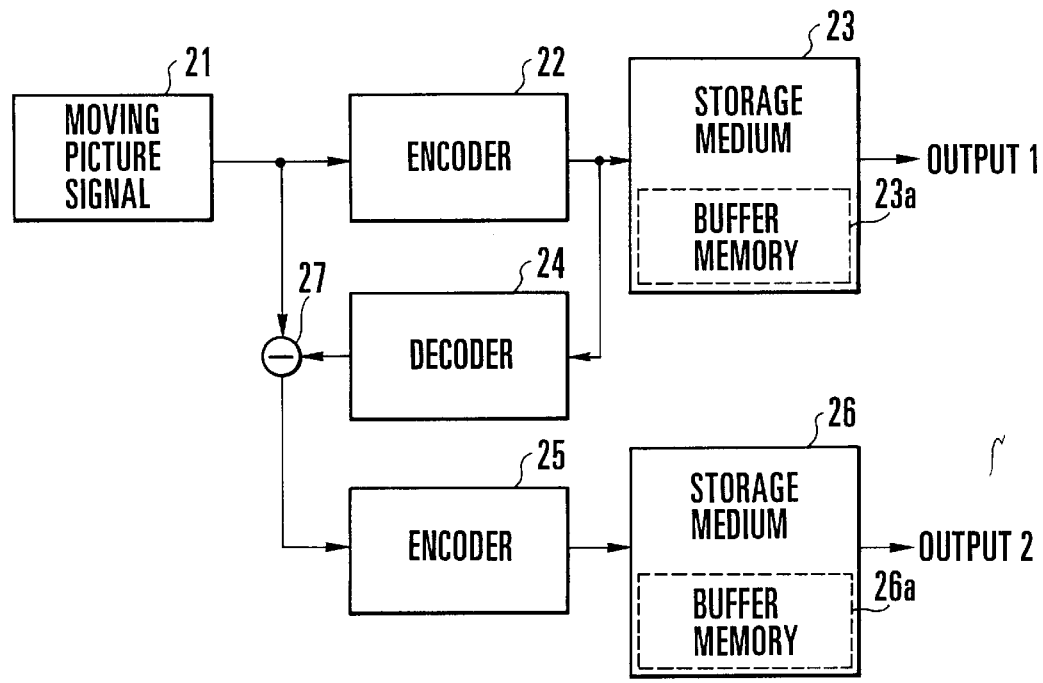
FIG. 2 is a block diagram of a data processor according to the second embodiment of the present invention in which two databases for a main signal and a coding distortion are simultaneously formed.

All of encoders 22 and 25, a decoder 24, and a subtracter 27 shown in FIG. 2 according to the second embodiment of the present invention are operable in real time. At the same time a moving picture signal 21 is input, the moving picture signal 21 and a coding distortion from the subtracter 27 are encoded, and the results are respectively stored in storage media 23 and 26. In this case, the storage media 23 and 26 require realtime input buffer memories 23a and 26a.

Depending on applications other than the above case, this processing must be executed in real time. For example, a live broadcast such as a sports program inevitably requires realtime processing.

Figure 3:
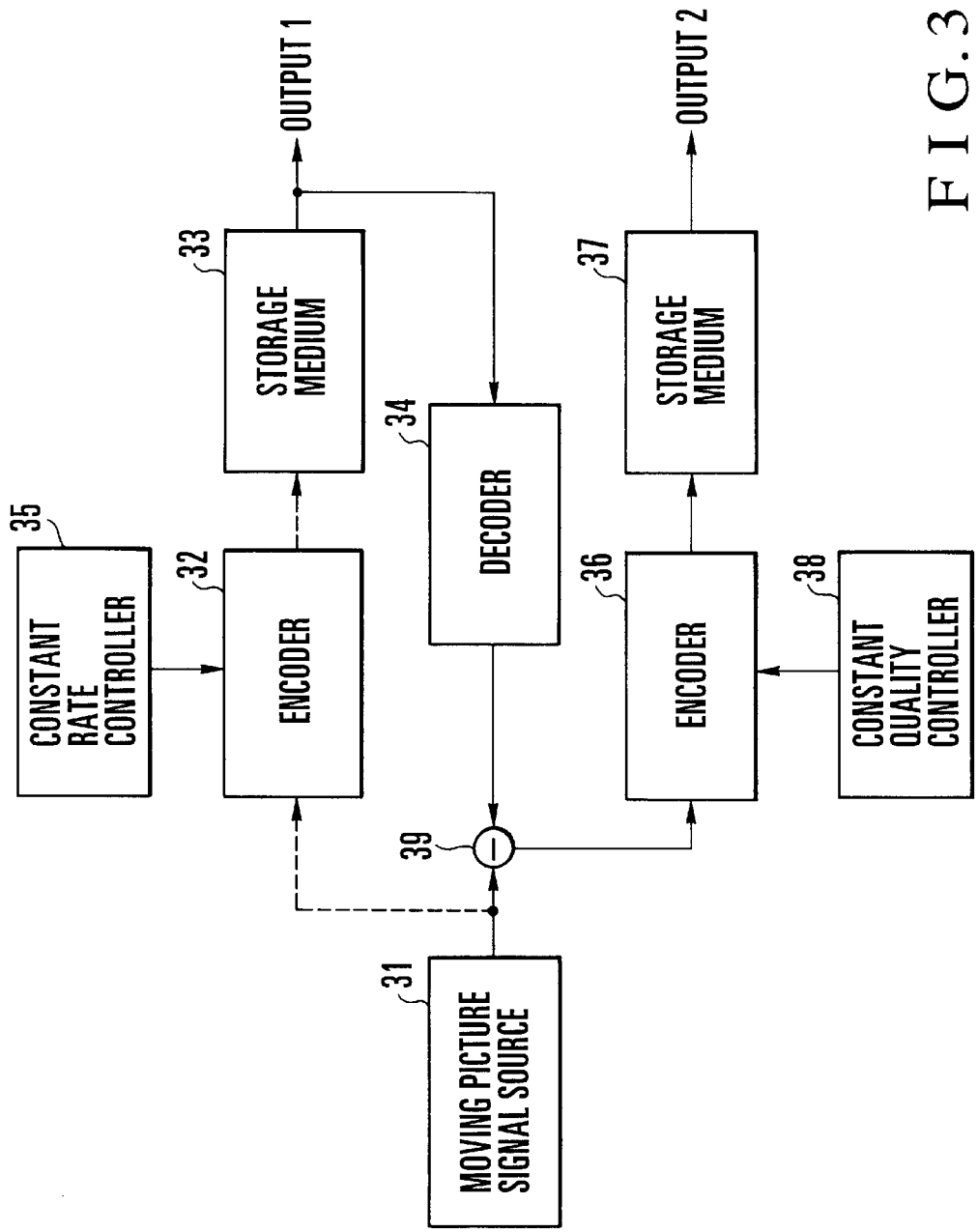
FIG. 3 is a block diagram of a data processor according to the third embodiment of the present invention.

FIG. 3 shows the third embodiment of the present invention. A moving picture signal supplied from a moving picture signal source 31 is controlled with a coding parameter by a constant rate controller 35 so as to keep the coding rate (transfer rate in the transfer system) constant, encoded by an encoder 32, and stored in a storage medium 33. Assume that this processing has been performed in advance at a past point, and the storage medium 33 functions as a constructed database.

For the descriptive convenience, an application of the present invention to a specific work (work A) will be explained. Work A encoded and stored in the storage medium 33 is read at a rate (real time) necessary for TV signal processing, while being decoded by a decoder 34. At this time, a subtracter 39 calculates a difference between work A and an input signal supplied at an adjusted timing to obtain a coding distortion. This coding distortion is encoded by an encoder 36 under such control as to keep its quality constant by a constant quality controller 38, and stored in a storage medium 37. This database system supplies both output 1 and output 2, which have the main-compensation information relationship.

Practically, the storage medium 33 cannot always operate in real time. In this case, the system must be devised such that a difference (coding distortion) from an input signal from the moving picture signal source 31 is calculated when an output from the storage medium 33 is decoded by one frame. However, this is not essential in the present invention.

As for the number of works, not only work A but also an enormous number of works are generally stored. As needed, the processing for work A is repeatedly executed for all the stored works.

Figure 10:
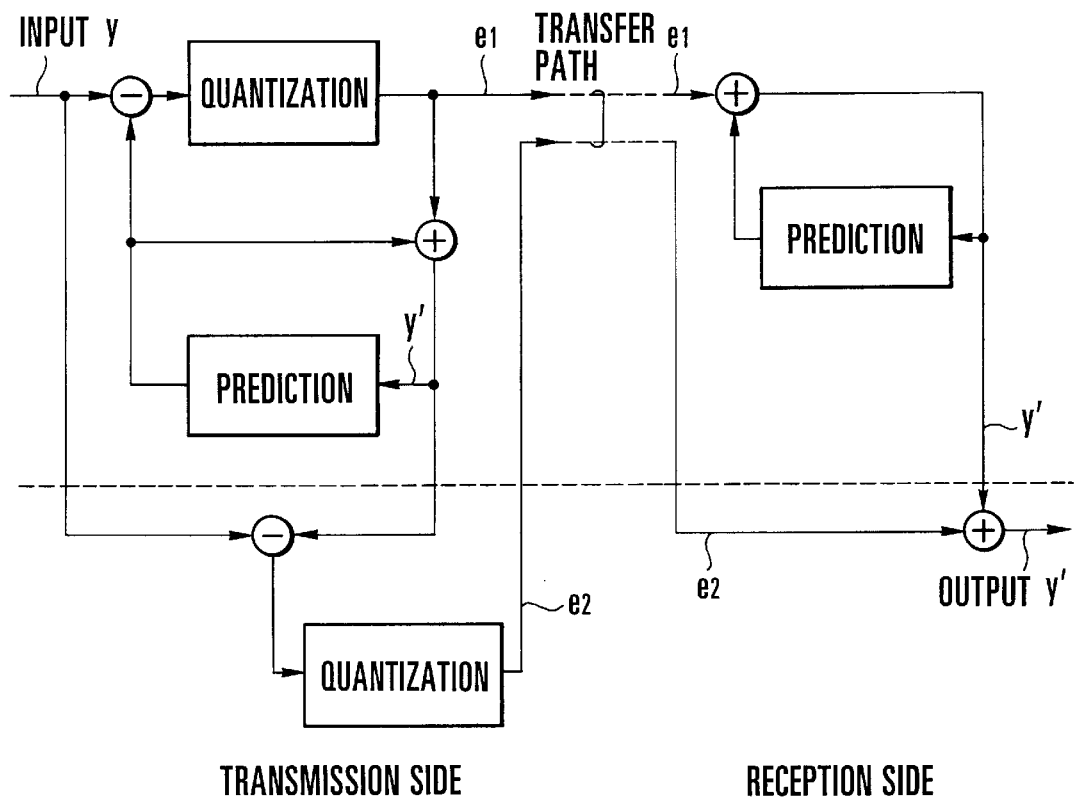
FIG. 10 is a block diagram of a conventional data processing system for transferring coding distortion information.

Coding control for a constant picture quality is easily realized. Normally, quantization characteristics should be fixed for a prediction error. In the present invention, quantization characteristics particularly in coding of a coding distortion are fixed. In FIG. 10, the quantization characteristics mean processing for adjusting the number of possible levels for prediction errors, and controlling an information generation situation. In general, this processing is the most effective for control of the generated information amount that limits the number of possible states.

In an actual service, both of these outputs are sent to the user, and used to perform decoding, thereby obtaining a picture with a higher quality than that in decoding only output 1.

The fourth embodiment exemplifying a case wherein the system operates in real time will be explained with reference to FIG. 4. A description of the same functions as those in FIG. 3 will omitted. At the same time a moving picture signal supplied from a moving picture signal source 41 in real time is encoded by an encoder 42, a decoded signal is generated by a decoder 44, and a difference (coding distortion) therebetween is generated in a subtracter 49. When data is only supplied without being stored, storage media 43 and 47 can be skipped to supply outputs 1 and 2. Reference numeral 46 denotes an encoder; and 48, a constant quality controller.

The difference between FIGS. 3 and 4 is that a coding distortion for either past encoded data stored in a database or currently encoded output data is obtained in generating a coding distortion. In FIG. 3, it is generally very difficult to construct a database in the same database as the conventional one, so that a physically different auxiliary database is used. In FIG. 4, a database is easily constructed in a single system.

FIG. 5 shows the first example when encoded data are supplied from two databases shown in FIGS. 1 to 4. An output section 120 supplies an output from a storage medium 113 via a communication path 101. An output section 130 supplies an output from a storage medium 116 via a gate 103 whose output is ON/OFF-controlled by a gate controller 104, and a communication path 102. The storage medium 113 corresponds to the storage medium 13, 23, 33, or 43, whereas the storage medium 116 corresponds to the storage medium 16, 26, 36, or 46.

Under the ON/OFF output control of the gate controller 104 for coding distortion information, output 2 (coding distortion information) is transmitted to a special user who pays an additional charge for, e.g., a pay service, while output of the coding distortion information is stopped for a normal user. Alternatively, instead of controlling the gate 103, execution/nonexecution of setting of the communication path 102 may be controlled.

This control can be executed in not the gate 103 but a user's receiver. In this case, the service provider sends a reception enable signal to a gate function installed in the user's receiver.

The special user means a user who can receive information about a coding distortion and decode a high-quality picture. The normal user means a user who can receive and decode only main encoded data.

FIG. 6 shows the second example when encoded data are supplied from two databases. In multiplexing two outputs from storage media 113 and 116 at a switch 105 in an output section 140, a multiplexing controller 106 instructs execution/nonexecution of multiplexing. That is, multiplexing of two outputs is executed for the special user, and only an output from the storage medium 113 is supplied to the normal user via a communication path 107.

Figure 7:
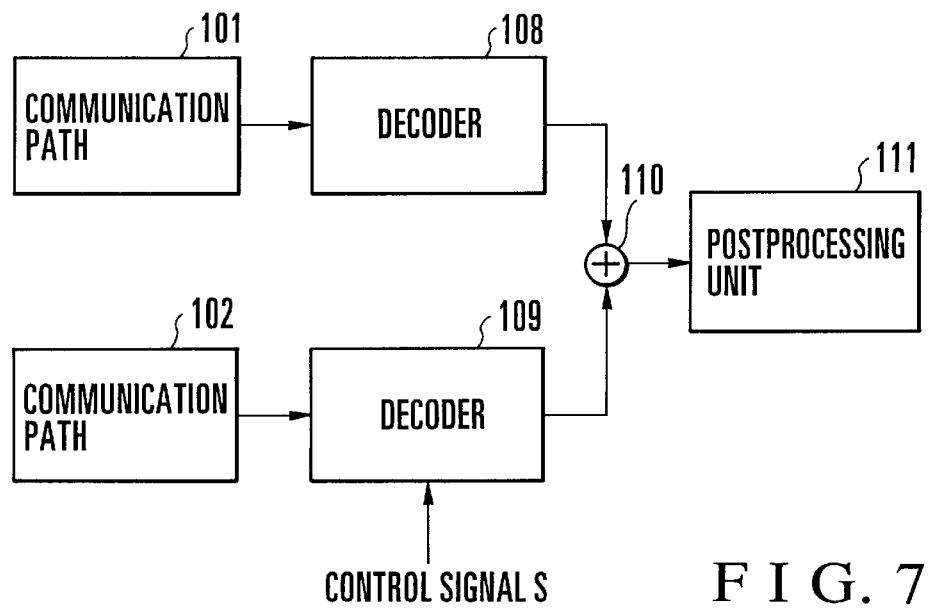
FIG. 7 is a block diagram of a receiver according to the fifth embodiment of the present invention.

FIG. 7 shows the arrangement of a receiver according to the fifth embodiment of the present invention. Main and compensation codes supplied via two communication paths 101 and 102 are respectively supplied to decoders 108 and 109 and decoded.

Not in a reception state as the special user, the decoder 109 is instructed to stop its operation by a control signal S, and outputs zero data in place of a coding distortion. In an adder 110, the coding distortion or zero data is added with a main signal from the decoder 108, and supplied to a postprocessing unit 111.

The postprocessing unit 111 basically performs scheme conversion into NTSC, PAL/SECAM, or the like, and processing for outputting and displaying data on a TV monitor.

If the system has a function of reducing/removing noise within a picture caused by coding, the gist of the present invention is not influenced. The special user can obtain coding distortion information from the decoder 109, whereas only zero data is output from, e.g., the decoder 109 to the normal user.

Figure 8:
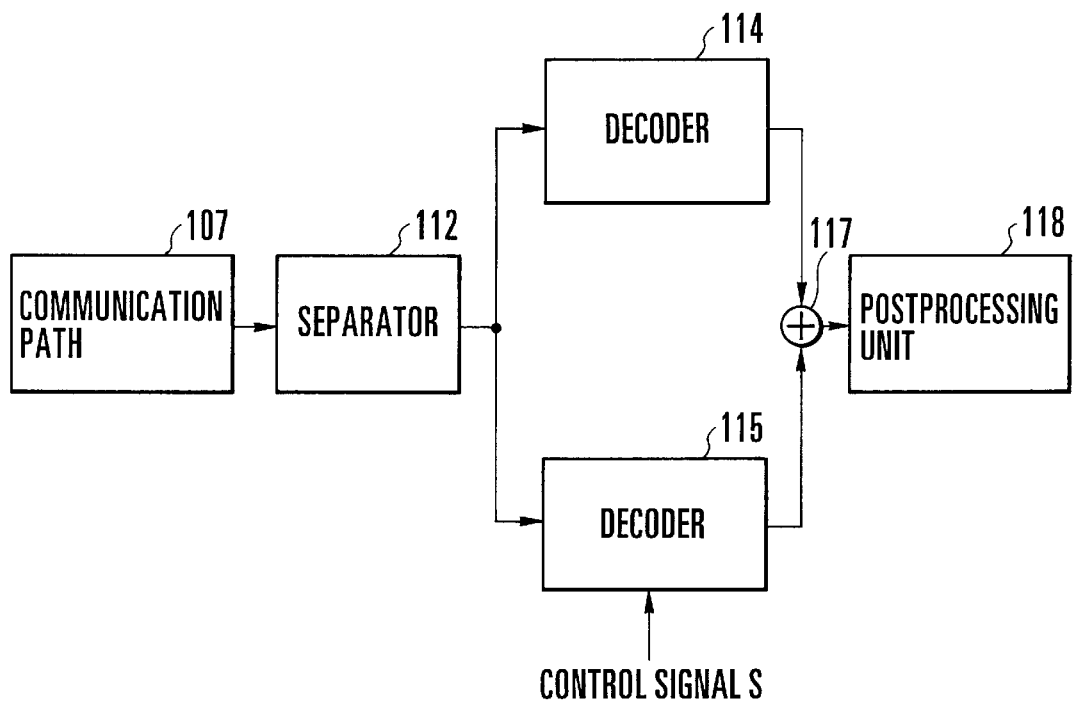
FIG. 8 is a block diagram of a receiver according to the sixth embodiment of the present invention.
Figure 9:
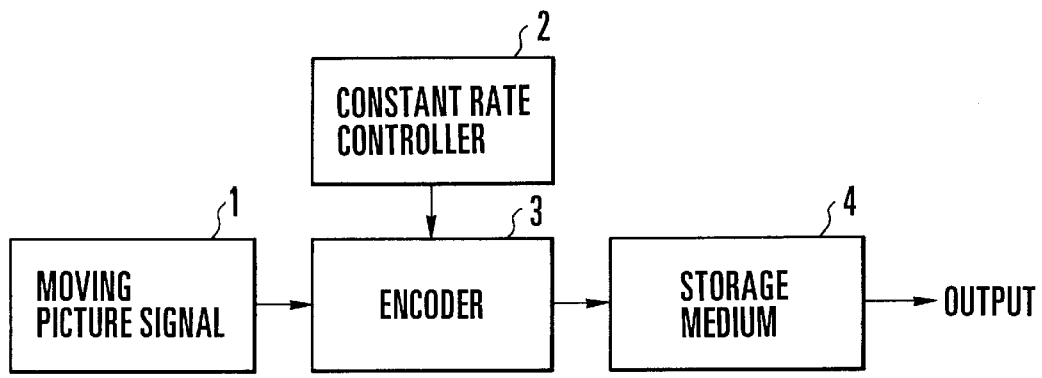
FIG. 9 is a block diagram of a conventional data processor storing a picture database.

FIG. 8 shows the arrangement of an apparatus on the reception side according to the sixth embodiment of the present invention. FIG. 8 shows the arrangement of a receiver when two outputs from the databases shown in FIG. 6 are multiplexed. Two multiplexed outputs supplied via a communication path 107 are separated by a separator 112, and input to decoders 114 and 115, respectively.

Not in a reception state as the special user, the decoder 115 is instructed to stop its operation by the control signal S, and outputs zero data in place of a coding distortion. In an adder 117, the coding distortion or zero data is added with a main signal from the decoder 114, and supplied to a postprocessing unit 118.

As has been described above, in constructing a dynamic picture database storing many encoded moving picture signals, the currently used method of storing encoded pictures at a fixed rate is not preferable because the picture quality varies depending on the spatial, time, and statistical properties of an input picture signal. In the future, higher-quality services will be gradually important, so the current method will become apparently unsatisfactory.

According to the conventional database construction method, coding distortion information corresponding to "compensation information" must be added to attain a higher-quality picture. Nevertheless, this information cannot be added due to structural limitations. A dynamic picture database of encoded pictures at a higher coding rate must be reconstructed.

According to the present invention, no "compensation information" is added to a moving picture signal having a satisfactory picture quality at a conventional coding rate, and a database storing "compensation information" is additionally constructed for only a moving picture signal in which a decrease in picture quality is recognized. In outputting information from the database, it suffices to supply main information and the "compensation information" parallel or upon multiplexing. An "old" database for the main information can be continuously used. Also, an old receiver which can meet with only the old database, a new receiver which receives information from the old database, and a new receiver which receives information from the new database can be used without any change.

An old receiver which receives information from the new database can be continuously used only by ignoring "compensation information".

In this manner, the effects of practical use of the present invention are very large. In the present invention, the method of encoding a "coding distortion" need not be the same as the method of encoding a signal. A fixed transfer rate need not be particularly used for the communication path through which the "coding distortion" is transferred. Even a variable line such as an ATM is usable, and the present invention is still effective in such an application.

What is claimed is:

1. A data processor comprising:
   first coding means for generating, by using a predetermined first coding method, a main code prepared by encoding a moving picture signal input as an original signal;
   first storage means for storing the main code generated by said first coding means;
   coding distortion calculation means for calculating a coding distortion generated upon coding by said first coding means;
   second coding means for encoding the coding distortion, by using a predetermined second coding method, calculated by said coding distortion calculation means, thereby generating a compensation code;
   second storage means for storing the compensation code generated by said second coding means; and
   output means for outputting the main and compensation codes respectively stored in said first and second storage means.

2. A processor according to claim 1, further comprising decoding means for receiving and decoding the main code stored in said first storage means, and
   wherein said coding distortion calculation means calculates the coding distortion on the basis of a difference between the main signal obtained upon decoding by said decoding means, and the original signal.

3. A processor according to claim 1, further comprising decoding means for receiving and decoding the main code encoded by said first coding means, and
   wherein said coding distortion calculation means calculates the coding distortion on the basis of a difference between the main signal obtained upon decoding by said decoding means, and the original signal.

4. A processor according to claim 1, wherein the second coding method is the same as the first coding method.

5. A processor according to claim 1, wherein the second coding method is part of the first coding method.

6. A processor according to claim 1, wherein said output means comprises
   first output means for outputting the main code stored in said first storage means to a first communication path, and
   second output means for outputting the compensation code stored in said second storage means to a second communication path logically independent of the first communication path.

7. A processor according to claim 6, wherein said second output means comprises compensation code output control means for controlling whether the compensation code stored in said second storage means is output, independently of output of the main code by said first output means.

8. A processor according to claim 1, wherein said output means comprises multiplexing means for multiplexing the main code stored in said first storage means, and the compensation code stored in said second storage means in correspondence with the main code, and
   said output means outputs the main and compensation codes multiplexed by said multiplexing means to a physically common communication path.

9. A processor according to claim 8, further comprising multiplexing control means for controlling said multiplexing means to select whether the multiplexed main and compensation codes are output or only the main code is output.

10. A data processor comprising a main data processor which receives a moving picture signal as an original signal, and stores a main code generated by performing lossy coding for the original signal, and an auxiliary data processor connected to said main data processor and used,
    said auxiliary data processor comprising:
    decoding means for receiving the main code from said main data processor, and decoding the main code into a main signal;
    coding distortion calculation means for receiving the original signal from said main data processor, and calculating a coding distortion from a difference between the original signal and the main signal;
    coding means for encoding, by using a predetermined coding method, the coding distortion calculated by said coding distortion calculation means, thereby generating a compensation code;
    storage means for storing the compensation code generated by said coding means; and
    output means for outputting the compensation code stored in said storage means.

11. A data receiver comprising:
    first decoding means for decoding a main code prepared by encoding a moving picture signal serving as a main signal input via a first communication path into a main signal;
    second decoding means for decoding a compensation code prepared by encoding a coding distortion of the main signal input via a second communication path into the coding distortion; and
    main signal compensation means for generating a compensated main signal from the main signal decoded by said first decoding means and the coding distortion decoded by said second decoding means.

12. A receiver according to claim 11, wherein said second decoding means selects based on an external control signal whether the coding distortion input via the second communication path is decoded.

13. A data receiver comprising:
    separation means for separating a main code prepared by encoding a moving picture signal serving as a multiplexed main signal input via a communication path, and a compensation code prepared by encoding a coding distortion of the main signal;
    first decoding means for decoding the main code separated by said separation means into the main signal;

second decoding means for decoding the compensation code separated by said separation means into the coding distortion; and main signal compensation means for generating a compensated main signal from the main signal decoded by said first decoding means and the coding distortion decoded by said second decoding means.

14. A receiver according to claim 13, wherein said second decoding means selects based on an external control signal whether the coding distortion separated by said separation means is decoded.

* * * * *